United States Patent
Oki

(10) Patent No.: US 8,149,226 B2
(45) Date of Patent: Apr. 3, 2012

(54) OPERATIONAL DIRECTION DETECTING DEVICE

(75) Inventor: Toshiyuki Oki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 374 days.

(21) Appl. No.: 12/466,352

(22) Filed: May 14, 2009

(65) Prior Publication Data

US 2009/0225055 A1    Sep. 10, 2009

Related U.S. Application Data

(63) Continuation of application No. PCT/JP2007/071928, filed on Nov. 12, 2007.

(30) Foreign Application Priority Data

Nov. 15, 2006  (JP) .................................. 2006-309027

(51) Int. Cl.
  *G06F 3/045*  (2006.01)
(52) U.S. Cl. ..................... 345/174; 345/173; 178/18.01; 178/18.06
(58) Field of Classification Search .................. 345/173, 345/174; 178/18.01, 18.03, 18.06, 18.05, 178/18.07; 341/33; 715/700–702, 863
  See application file for complete search history.

(56) References Cited

U.S. PATENT DOCUMENTS

| | | | |
|---|---|---|---|
| 4,305,007 A * | 12/1981 | Hughes | ........................ 307/116 |
| 5,886,687 A | 3/1999 | Gibson | |
| 6,411,285 B1 | 6/2002 | Miyazawa | |
| 6,621,487 B2 | 9/2003 | Iwasaki et al. | |
| 2004/0158374 A1 | 8/2004 | Suzuki | |
| 2004/0178997 A1 | 9/2004 | Gillespie et al. | |
| 2006/0022959 A1* | 2/2006 | Geaghan | ........................ 345/173 |
| 2006/0028453 A1* | 2/2006 | Kawabe | ........................ 345/173 |
| 2006/0033701 A1 | 2/2006 | Wilson | |
| 2006/0132447 A1 | 6/2006 | Conrad | |
| 2006/0250376 A1 | 11/2006 | Takahashi | |
| 2007/0279385 A1 | 12/2007 | Woolley et al. | |

(Continued)

FOREIGN PATENT DOCUMENTS

JP       06-149463       5/1994

(Continued)

OTHER PUBLICATIONS

Search Report dated Jan. 8, 2008 from International Application No. PCT/JP2007/071928.

(Continued)

*Primary Examiner* — Amare Mengistu
*Assistant Examiner* — Koosha Sharifi-Tafreshi
(74) *Attorney, Agent, or Firm* — Beyer Law Group LLP

(57) ABSTRACT

An operational direction detecting device includes a device body that includes an operational area operable in two or more directions, two or more detection electrode/drive electrode pairs that are formed at direction detecting positions of the operational area and form capacitance between a detection electrode and a drive electrode, and a control unit that decides an entrance direction of an object to be detected from capacitance acquired by each of the two or more detection electrode/drive electrode pairs when an object to be detected performing an operation enters the operational area. The control unit decides the direction of the area corresponding to larger capacitance as the entrance direction of the object to be detected when the composite capacitance of capacitances acquired at the two or more detection electrode/drive electrode pairs exceeds a first predetermined value.

6 Claims, 4 Drawing Sheets

U.S. PATENT DOCUMENTS

| | | |
|---|---|---|
| 2008/0012835 A1 | 1/2008 | Rimon et al. |
| 2009/0084612 A1* | 4/2009 | Mattice et al. ............. 178/18.04 |
| 2009/0284465 A1 | 11/2009 | Oki et al. |
| 2009/0284496 A1 | 11/2009 | Oki |

FOREIGN PATENT DOCUMENTS

| | | |
|---|---|---|
| JP | 09-311761 | 12/1997 |
| JP | 2001-087549 | 4/2001 |
| JP | 2001-100905 | 4/2001 |
| JP | 2001-184160 | 7/2001 |
| JP | 2004-245606 | 9/2004 |
| JP | 2006-318082 | 11/2006 |

OTHER PUBLICATIONS

Office Action dated Oct. 12, 2011 from U.S. Appl. No. 12/511,981.
Search Report dated Mar. 4, 2008 from International Application No. PCT/JP2008/051321.
Office Action dated Oct. 27, 2011 from U.S. Appl. No. 12/511,984.
Search Report dated May 13, 2008 from International Application No. PCT/JP2008/051322.

* cited by examiner

CAPACITANCE VALUE (LEFT)

CAPACITANCE VALUE (RIGHT)

CAPACITANCE VALUE (COMPOSITE)

VALUE OF DETECTED VARIATION OF COMPOSITE CAPACITANCE (DIFFERENTIAL VALUE)

OPERATIONAL DIRECTION DETECTING DEVICE

CROSS REFERENCE TO RELATED APPLICATIONS

This application is a continuation of International Application No. PCT/JP2007/071928, filed Nov. 12, 2007, which claims benefit of Japanese Patent Application No. 2006-309027, filed Nov. 15, 2006, the entire contents of both are hereby incorporated by reference.

BACKGROUND

1. Technical Field

The present invention relates to an operational direction detecting device that detects the operational direction of an operator.

2. Related Art

There is a method disclosed in Japanese Unexamined Patent Application Publication No. 2004-245606 as a method of determining which direction a hand of an operator is stretched from. This method detects a position where the hand of the operator approaches and a position that is indicated by the hand on the basis of a position where the capacitance is formed when the hand of the operator approaches the display screen, by a touch sensor including a capacitance forming film that forms capacitance between itself and the hand of the operator when an operator touches a display screen.

Further, there has been developed a method of detecting a neighboring object by an ultrasonic sensor or an infrared sensor.

However, in the technique disclosed in Japanese Unexamined Patent Application Publication No. 2004-245606, an object to be operated is limited to the touch sensor that includes the capacitance forming film. Further, in this technique, the amount of formed capacitance is very small. Accordingly, there has been a problem in that the hand of the operator should very approach the touch sensor in order to accurately detect the direction. In addition, since other objects except for a human body are also moved, it is not possible to reliably detect only the operator in the method of detecting a neighboring object by an ultrasonic sensor or an infrared sensor.

SUMMARY

An advantage of some aspects of the invention is to provide an operational direction detecting device that is not limited to an object to be operated, has high approach sensitivity against a human body, and can reliably detect only an operator.

According to an aspect of the invention, an operational direction detecting device includes a device body that includes an operational area operable in two or more directions, two or more detection electrode/drive electrode pairs that are formed at direction detecting positions of the operational area and form capacitance between a detection electrode and a drive electrode, and a control unit that decides an entrance direction of an object to be detected from capacitance acquired by each of the two or more detection electrode/drive electrode pairs when an object to be detected performing an operation enters the operational area. The control unit decides the direction of the area corresponding to larger capacitance as the entrance direction of the object to be detected when the composite capacitance of capacitances acquired at the two or more detection electrode/drive electrode pairs exceeds a first predetermined value.

According to this configuration, since the detection electrode/drive electrode pairs are provided at the operational area, the configuration for mounting the operational direction detecting device is not affected. For this reason, the detection electrode/drive electrode pairs may be mounted on devices having various kinds of configuration. Further, according to this configuration, if the size of the detection electrode or the drive electrode is changed according to the extent of the detection range, it is possible to accurately detect the operational direction without being affected by the extent of the detection range. Furthermore, in this configuration, the capacitance is detected when an operator enters the operational area. Accordingly, the operational direction detecting device has high approach sensitivity against a human body and can reliably detect only an operator.

In the operational direction detecting device according to the invention, when the composite capacitance becomes smaller than the first predetermined value after exceeding the first predetermined value, the entrance direction of the object to be detected, which is decided when the composite capacitance exceeds the first predetermined value, may be maintained if time while the composite capacitance is smaller than the first predetermined value is shorter than a second predetermined value. According to this configuration, it is possible to accurately detect an operational direction even in an operation continuing state.

According to an aspect of the invention, an operational direction detecting device includes a device body that includes an operational area operable in two or more directions, two or more detection electrode/drive electrode pairs that are formed at direction detecting positions of the operational area and form capacitance between a detection electrode and a drive electrode, and a control unit that decides an entrance direction of an object to be detected from capacitance acquired by each of the two or more detection electrode/drive electrode pairs when an object to be detected performing an operation enters the operational area. The control unit decides the direction of the area corresponding to larger capacitance as the entrance direction of the object to be detected when the variation of the composite capacitance of capacitances acquired at the two or more detection electrode/drive electrode pairs exceeds a first predetermined value. Since the detection electrode/drive electrode pairs are provided at the operational area, the configuration for mounting the operational direction detecting device is not affected. For this reason, the detection electrode/drive electrode pairs may be mounted on devices having various kinds of configuration. Further, according to this configuration, if the size of the detection electrode or the drive electrode is changed according to the extent of the detection range, it is possible to accurately detect the operational direction without being affected by the extent of the detection range. Furthermore, in this configuration, the capacitance is detected when an operator enters the operational area. Accordingly, the operational direction detecting device has high approach sensitivity against a human body and can reliably detect only an operator. In addition, according to this configuration, it is possible to more accurately decide the entrance direction regardless of other factors that affect capacitance.

According to the aspect of the invention, an operational direction detecting device includes a device body that includes an operational area operable in two or more directions, two or more detection electrode/drive electrode pairs that are formed at direction detecting positions of the operational area and form capacitance between a detection electrode and a drive electrode, and a control unit that decides an entrance direction of an object to be detected from capacitance acquired by each of the two or more detection electrode/drive electrode pairs when an object to be detected performing an operation enters the operational area. The operational direction detecting device is not limited to an object to be operated, has high approach sensitivity against a human body, and can reliably detect only an operator.

BRIEF DESCRIPTION OF THE DRAWINGS

FIG. 1 is a view showing an operational direction detecting device according to an embodiment of the invention, wherein

FIG. 3 is a view illustrating a detection principle of the operational direction detecting device according to the embodiment of the invention, wherein

FIG. 4 is a view illustrating another detection principle of the operational direction detecting device according to the embodiment of the invention, wherein

DESCRIPTION OF EXEMPLARY EMBODIMENTS

An embodiment of the invention will be described in detail below with reference to the accompanying drawings.

Figure 1A:
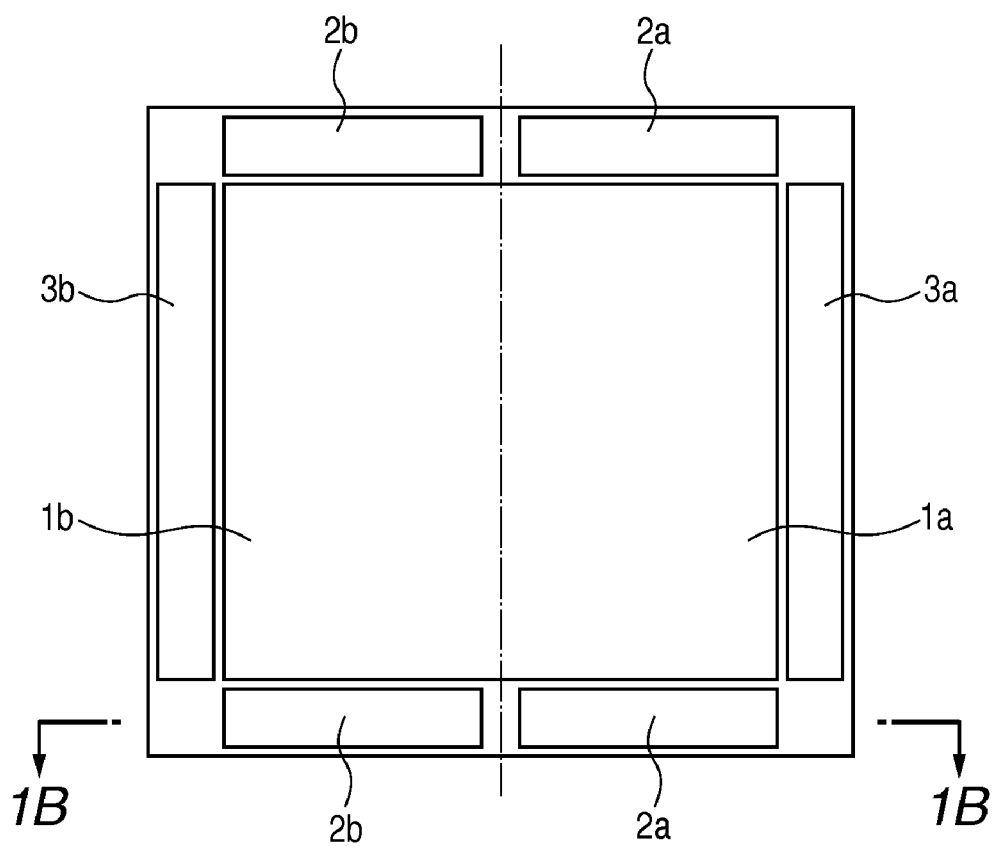
FIG. 1A is a plan view and FIG. 1B is a cross-sectional view taken along a line IB-IB of FIG. 1A.
Figure 1B:
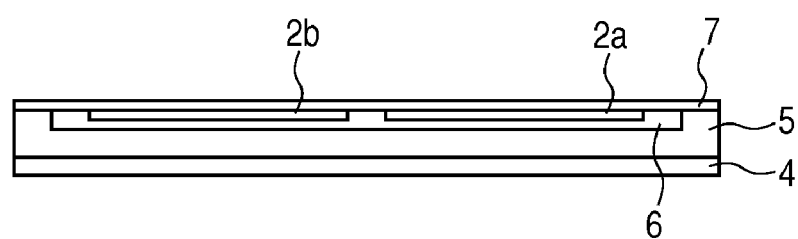

FIG. 1 is a view showing an operational direction detecting device according to an embodiment of the invention, wherein FIG. 1A is a plan view and FIG. 1B is a cross-sectional view taken along a line IB-IB of FIG. 1A.

An operational direction detecting device shown in FIG. 1 includes an operational area that is operable in two or more directions, that is, two operational areas 1a and 1b herein that are virtually divided approximately in the middle. In this embodiment, the operational area will be divided into two, that is, left and right areas. However, in the invention, the operational area may be divided into two, that is, upper and lower areas or may be divided into three or more areas.

As shown in FIG. 1A, detection electrodes 2 and drive electrodes 3, which form capacitance therebetween, are provided in the vicinity of each of the operational areas (at direction detecting positions). That is, detection electrodes 2a and a drive electrode 3a are provided in the vicinity of a right area 1a, and detection electrodes 2b and a drive electrode 3b are provided in the vicinity of a left area 1b. In this embodiment, the detection electrodes 2a and 2b are separately provided at upper and lower sides of the operational area, and the drive electrodes 3a and 3b are provided at left and right sides of the operational area. However, the direction detecting positions of each of the operational areas may be positions where the entrance direction of an object to be detected can be detected. If the detection electrodes and the drive electrodes are provided at the direction detecting positions (there are detection electrode/drive electrode pairs), the number and disposed positions of electrodes are not particularly limited.

As shown in FIG. 1B, the operational direction detecting device includes a ground electrode 5 that is provided on a base 4, the detection electrodes 2a and 2b that are provided on the ground electrode 5 with an insulating layer 6 interposed between the detection electrodes and the ground electrode, and an insulating layer 7 that is provided on the detection electrodes.

Figure 2:
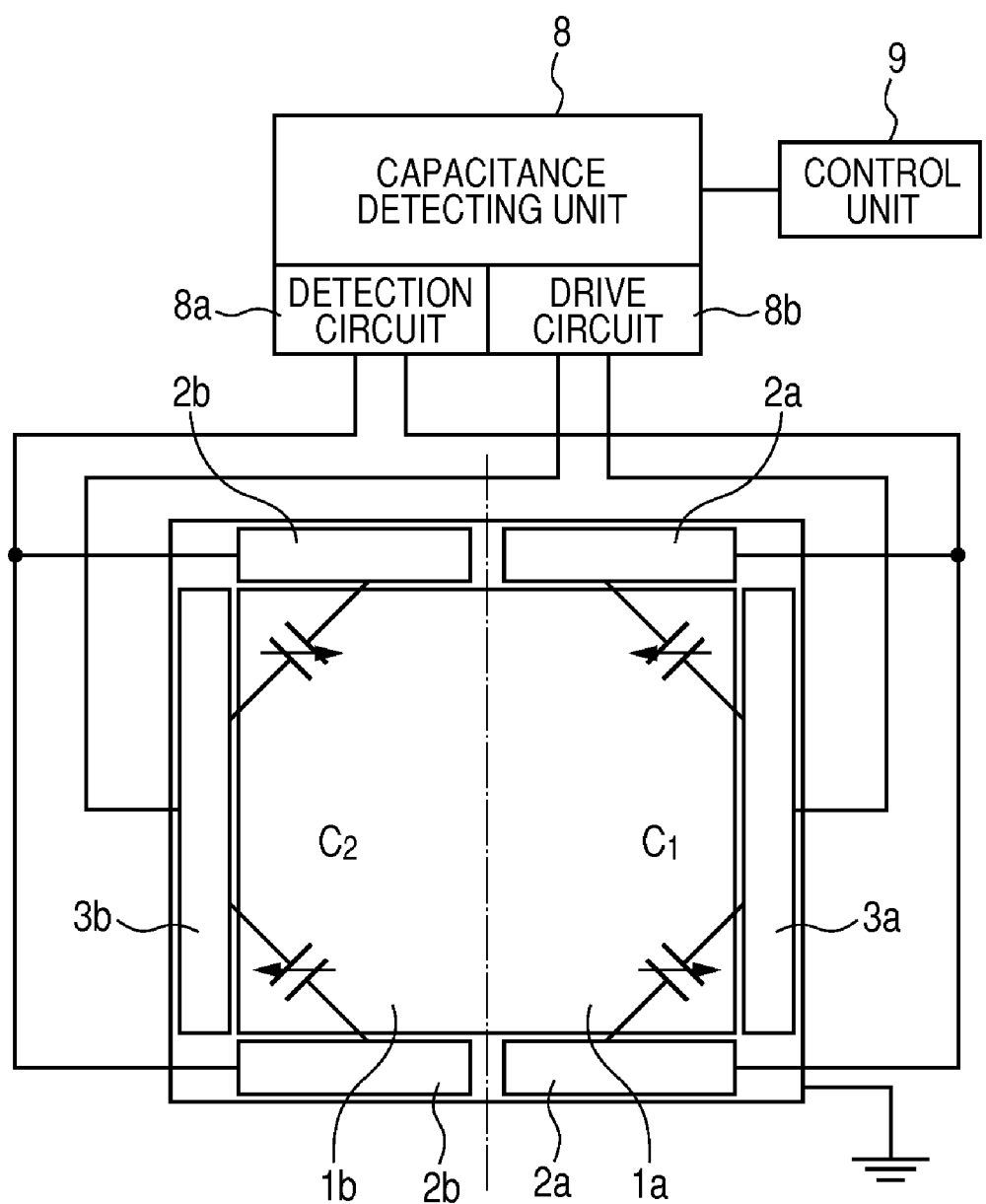
FIG. 2 is a block diagram showing the schematic configuration of the operational direction detecting device according to the embodiment of the invention.

FIG. 2 is a block diagram showing the schematic configuration of the operational direction detecting device according to the embodiment of the invention. The detection electrodes 2a and 2b of the operational direction detecting device are electrically connected to a detection circuit 8a of a capacitance detecting unit 8, and the drive electrodes 3a and 3b are electrically connected to a drive circuit 8b of the capacitance detecting unit 8. The capacitance detecting unit 8 is electrically connected to a control unit 9. The control unit decides the entrance direction of an operator from the capacitance that is acquired at each of the detection electrode/drive electrode pairs when the object to be detected (operator) performing an operation on the operational area enters the operational area.

Capacitance is always formed between the detection electrode and the drive electrode. Herein, capacitance C1 is formed between the detection electrode 2a and the drive electrode 3a, and capacitance C2 is formed between the detection electrode 2b and the drive electrode 3b. The drive circuit 8b applies drive voltages having specific frequencies to the drive electrodes 3a and 3b, respectively. Further, the detection circuit 8a is always in a state corresponding to a reference voltage. Furthermore, the ground electrode 5 is grounded so as to reduce the influence from a direction that is unrelated to a detection direction necessary to detect a direction.

If the operator is not close to the operational direction detecting device having the above-mentioned configuration, the capacitances C1 and C2 are not changed even though the same AC voltage is applied to the drive electrodes 3a and 3b by the drive circuit 8b. In this case, if the operator enters any of the operational areas 1a and 1b, capacitance is formed between the operator and the electrodes. Accordingly, the capacitance between the detection electrode and the drive electrode is changed. This change in capacitance is detected by the detection circuit 8a. The information on the change in capacitance that is detected by the detection circuit 8a, that is, the information on the composite capacitance of the capacitance acquired at the right area 1a and the capacitance acquired at the left area 1b is sent to the control unit 9, so that the entrance direction of the operator is decided by the control unit 9.

If the composite capacitance of the capacitance acquired at the right area 1a and the capacitance acquired at the left area 1b exceeds a predetermined threshold value, the direction of the area corresponding to larger capacitance is decided as the entrance direction of the operator by the control unit 9.

Figure 3A:
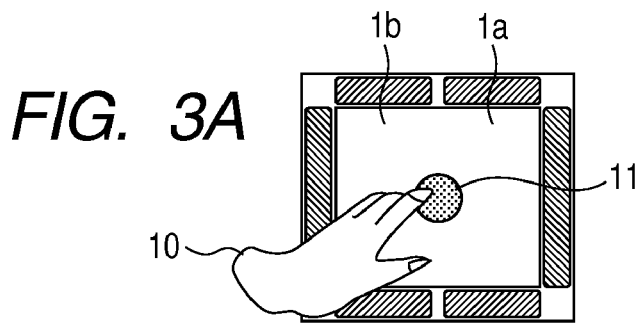
FIG. 3A is a view showing an operational state and FIGS. 3B to 3E are views illustrating the change in capacitance.
Figure 3B:
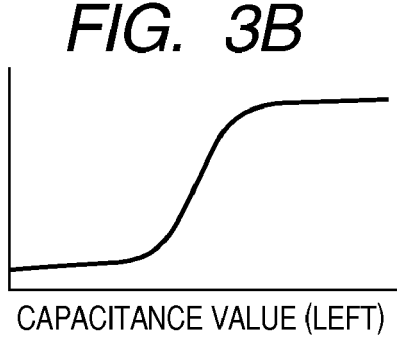
Figure 3C:
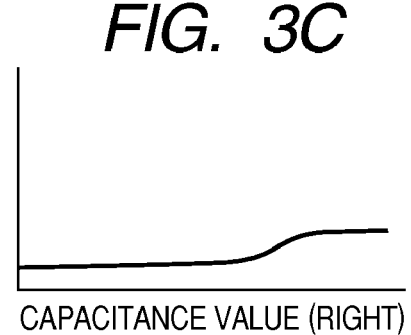
Figure 3D:
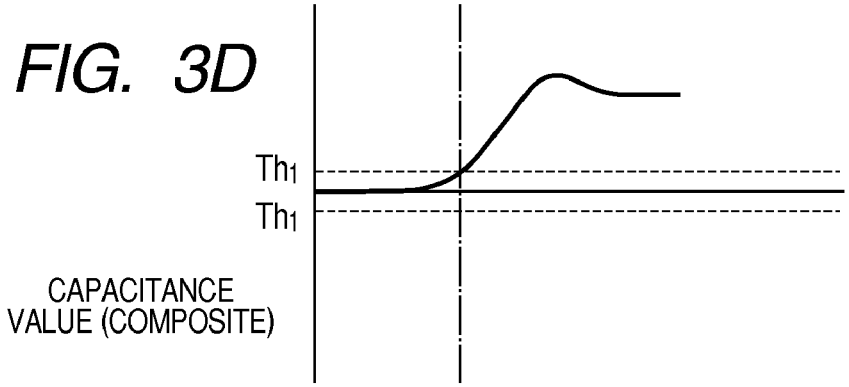

The decision of the entrance direction of an operating object will be described herein with reference to FIG. 3. If a hand 10 of an operator approaches an object 11 to be operated from the left side as shown in FIG. 3A, the capacitance C2 between the detection electrode 2b and the drive electrode 3b of the left area 1b is changed. That is, as shown in FIG. 3B, a capacitance value is increased due to series capacitance of the capacitance C2 and the capacitance caused by the hand 10 of the operator. In this case, the capacitance C1 between the detection electrode 2a and the drive electrode 3a of the right area 1a is changed. However, since the hand 10 of the operator is distant from the right area as compared to the left area 1b, the variation of the capacitance of the right area is smaller than that of the left area 1b as shown in FIG. 3C. The change of the composite capacitance, which is acquired by composing the capacitance of the left area 1b and the capacitance of the right area 1a, is shown in FIG. 3D. If the composite capacitance exceeds a predetermined threshold value Th1, the direction of the area corresponding to larger capacitance is decided as the entrance direction of the operator by the control unit 9. The direction of the area corresponding to larger capacitance, that is, the direction of the left area 1b is decided herein as the entrance direction of the operator.

Figure 3E:
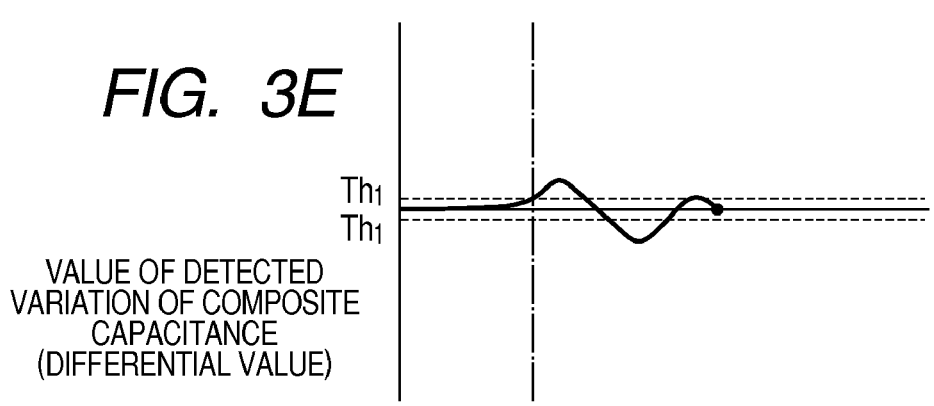

Further, in the decision of the entrance direction that is performed by the control unit 9, as shown in FIG. 3E, the variation of the composite capacitance is acquired every predetermined time, that is, a differential value is acquired, and the direction of the area corresponding to larger capacitance may be decided as the entrance direction of the operator when the differential value exceeds a predetermined threshold value Th2. If this decision method is employed, it is possible to more accurately decide the entrance direction regardless of other factors that affect capacitance.

Figure 4A:
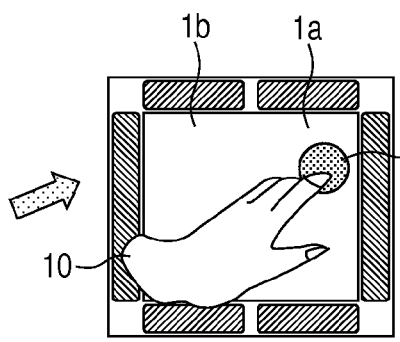
FIGS. 4A and 4B are views showing an operational state and FIGS. 4C to 4E are views illustrating the change in capacitance.
Figure 4B:
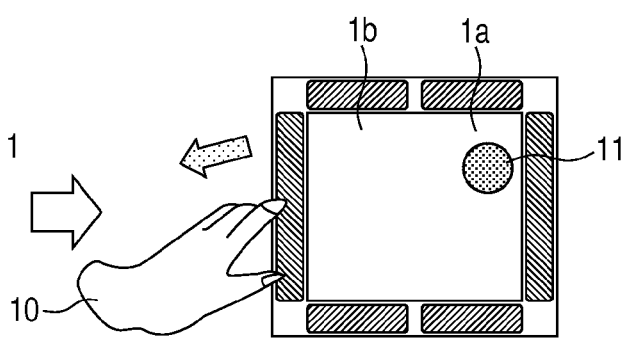
Figure 4C:
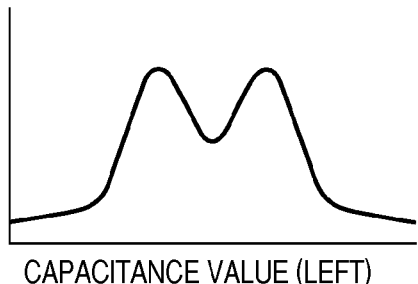
Figure 4D:
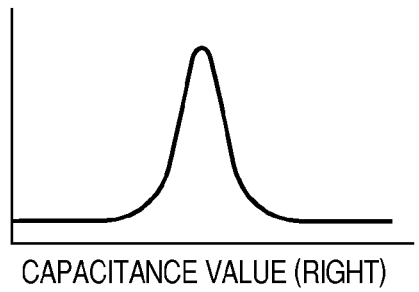

In the above-mentioned decision method, if an operator operates the object 11 to be operated which placed on the right side from the left area 1b as shown in FIGS. 4A and 4B, it is considered that the capacitance of the right area 1a exceeds the capacitance of the left area 1b as shown in FIGS. 4C and 4D. That is, since the hand 10 of the operator enters from the left area 1b and exits from the left area 1b as shown in FIGS. 4A and 4B, the capacitance is changed as shown in FIG. 4C and shows two peaks at the time of entrance and exit. Meanwhile, since the object 11 to be operated exists in the right area 1a, the hand 10 of the operator further approaches the right area. Therefore, as shown in FIG. 4D, a peak value of the capacitance value of the right area is larger than that of the left area 1b.

Figure 4E:
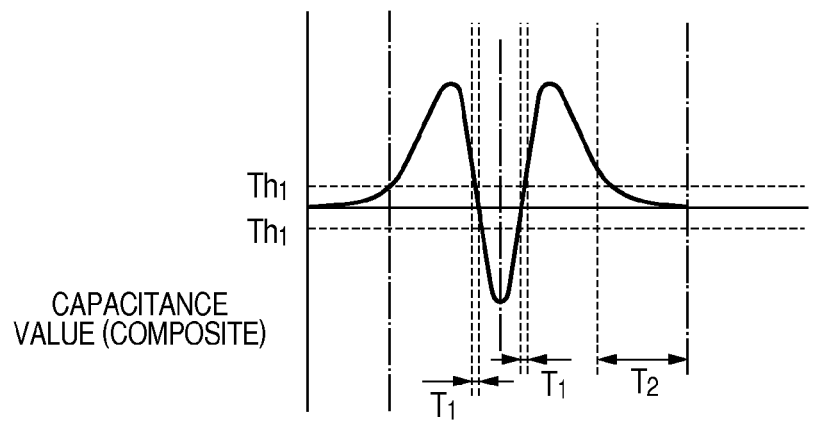

Assuming this case, a steady state where the hand of the operator does not approach needs to be distinguished from an operation continuing state where the hand of the operator is being moved. In this case, a predetermined time required until the determination of the steady state is set, and the current state is determined as the operation continuing state if the time, while the composite capacitance is smaller than a predetermined threshold value, is within the predetermined time (smaller than a predetermined threshold value Th2). Further, the entrance direction, which is decided when the composite capacitance exceeds the threshold value Th1 for the first time, is maintained in the operation continuing state. Referring to FIG. 4E, when the composite capacitance becomes smaller than the threshold value Th1 after exceeding the predetermined threshold value Th1, the current state is determined as the operation continuing state if a time T1, while the composite capacitance is smaller than the predetermined threshold value Th1, is within a predetermined time (smaller than a predetermined threshold value Th2). In this case, the entrance direction (left direction), which is decided when the composite capacitance exceeds the threshold value Th1, is maintained. Meanwhile, if the time T2, while the composite capacitance is smaller than the predetermined threshold value Th1, is out of a predetermined time (equal to or larger than a predetermined threshold value Th2), the current state is determined as the steady state and the result of the determination is reset. If the determination is performed as described above, it is possible to accurately detect an operational direction even in the operation continuing state.

As described above, the operational direction detecting device according to the embodiment of the invention decides the entrance direction of the operator from a value that is obtained by composing the capacitances acquired using the detection electrode/drive electrode pairs. In this case, the detection electrode/drive electrode pairs are provided at the operational area that is operable in two or more directions. Accordingly, the operational direction detecting device is not limited to an object to be operated, has high approach sensitivity against a human body, and can reliably detect only an operator. That is, in this configuration, it is preferable that the detection electrode/drive electrode pairs be provided at the operational area. Accordingly, the configuration for mounting the operational direction detecting device is not affected. For this reason, the detection electrode/drive electrode pairs may be mounted on devices having various kinds of configuration. Further, according to this configuration, if the size of the detection electrode or the drive electrode is changed according to the extent of the detection range, it is possible to accurately detect the operational direction without being affected by the extent of the detection range. Furthermore, in this configuration, the capacitance is detected when an operator enters the operational area. Accordingly, the operational direction detecting device has high approach sensitivity against a human body and can reliably detect only an operator.

The operational direction detecting device according to the embodiment of the invention may be used for a pointing device that is mounted, for example, on a laptop computer. The pointing device using the operational direction detecting device according to the embodiment of the invention may perform different operations when being operated by a right hand and when being operated by a left hand. Accordingly, a user interface may be diversified. Further, the operational direction detecting device may be used in an electronic game board for Go, Japanese Chess, Othello, or the like that is played using only a screen including a touch panel. Since the electronic game board using the operational direction detecting device according to the embodiment of the invention can identify a player who has performed an operation, it is possible to prevent a false operation where a player performs an operation in opponent's turn by mistake, and to improve usability. Further, the operational direction detecting device may be used for a switch that may cause danger when a child operates the switch by mistake, that is, a switch such as an ignition switch of an apparatus that deals with fire like a stove burner, an oil fan heater, or the like. If detection electrode/drive electrode pairs are provided at upper and lower portions of a switch using the operational direction detecting device according to the embodiment of the invention, the switch does not perform ignition since there is a possibility that a short child operates the switch when it is determined that the switch is operated from below. Meanwhile, when being operated from above, the switch may perform ignition. For this reason, since the operations of an adult and a child are different from each other even though the same switch is operated, there is no problem that a child remembers a child-lock operation.

The invention is not limited to the embodiment, and may be modified in various ways. For example, the detection electrode/drive electrode pairs have been provided at the left and right operational areas in the above-mentioned embodiment, but the detection electrode/drive electrode pairs may be provided at any one operational area in the invention. For example, if the approach of the operator is limited to a specific direction, detection electrode/drive electrode pairs are provided only at the operational area thereof. Accordingly, it is possible to more accurately detect an operational direction. Further, four sets of the detection electrode/drive electrode pairs are provided and the operations in four directions may be detected. In this case, when the composite capacitance of capacitances at the detection electrode/drive electrode pairs corresponding to the directions exceeds a predetermined threshold value, the direction corresponding to the maximum capacitance may be decided as the entrance direction of the operator. Further, when a differential value exceeds a predetermined threshold value, the direction corresponding to the maximum differential value may be decided as the entrance direction of the operator. Accordingly, it may be possible to improve the usability of a game board on which several persons play a game. Further, the others may be appropriately modified without departing from the scope and spirit of the invention.

It should be understood by those skilled in the art that various modifications, combinations, sub-combinations and alterations may occur depending on design requirements and other factors insofar as they are within the scope of the appended claims of the equivalents thereof.

What is claimed is:

1. An operational direction detecting device for determining an entrance direction of an object performing an operation, the device comprising:
   a device body that includes an operational area operable in at least two directions, the operational area including at least two sub-areas corresponding to the at least two directions;
   at least two electrode pairs, each electrode pair being provided for corresponding one of the at least two sub-areas, each electrode pair including a drive electrode and a detection electrode, a capacitance being formed between the detection electrode and the drive electrode adjacent each other; and
   a control unit configured to determine the entrance direction of the object from a capacitance acquired by each of the at least two electrode pairs when the object enters the operational area,
   wherein the control unit determines the direction corresponding to the sub-area having a largest capacitance as the entrance direction of the object when a composite capacitance of the capacitances acquired by the at least two electrode pairs exceeds a first predetermined value,
   and wherein the determination of the entrance direction of the object is maintained when the composite capacitance becomes smaller than the first predetermined value after exceeding the first predetermined value, if a time period during which the composite capacitance is smaller than the first predetermined value is shorter than a predetermined time period.

2. An operational direction detecting device for determining an entrance direction of an object performing an operation, the device comprising:
   a device body that includes an operational area operable in at least two directions, the operational area being divided into at least two sub-areas corresponding to the at least two directions;
   at least two electrode pairs, each electrode pair being provided for corresponding one of the at least two sub-areas, each electrode pair including a drive electrode and a detection electrode, a capacitance being formed between the detection electrode and the drive electrode adjacent each other; and
   a control unit configured to determine the entrance direction of the object from a capacitance acquired by each of the at least two electrode pairs when the object enters the operational area,
   wherein the control unit determines the direction corresponding to the sub-area having a largest capacitance as the entrance direction of the object when a differential value of a composite capacitance of the capacitances acquired by the at least two electrode pairs exceeds a first predetermined value.

3. The operational direction detecting device according to claim 1, wherein the at least two electrode pairs comprises four electrode pairs, and operations in four directions are detected.

4. The operational direction detecting device according to claim 2,
   wherein the determination of the entrance direction of the object is maintained when the composite capacitance becomes smaller than the first predetermined value after exceeding the first predetermined value, if a time period during which the composite capacitance is smaller than the first predetermined value is shorter than a predetermined time period.

5. An operational direction detecting device for determining an entrance direction of an object performing an operation, the device comprising:
   a device body that includes an operational area operable in at least two directions, the operational area including at least two sub-areas corresponding to the at least two directions;
   an electrode pair provided for each of the at least two sub-areas, each electrode pair including a drive electrode and a detection electrode, a capacitance being formed between the detection electrode and the drive electrode adjacent each other; and
   a control unit configured to determine the entrance direction of the object from a capacitance acquired by each of the at least two electrode pairs when the object enters the operational area,
   wherein the control unit determines the direction corresponding to the sub-area having a largest capacitance as the entrance direction of the object when a composite capacitance of the capacitances acquired by the at least two electrode pairs exceeds a first predetermined value.

6. The operational direction detecting device according to claim 5, further comprising:
   a drive circuit configured to apply a drive voltage having a frequency to each drive electrode; and
   a detection circuit connected to each detection electrode and maintained at a predetermined reference voltage.

* * * * *